Aug. 22, 1967     B. E. FREUND     3,337,156
SEAT BELT RETRACTOR
Filed April 28, 1965
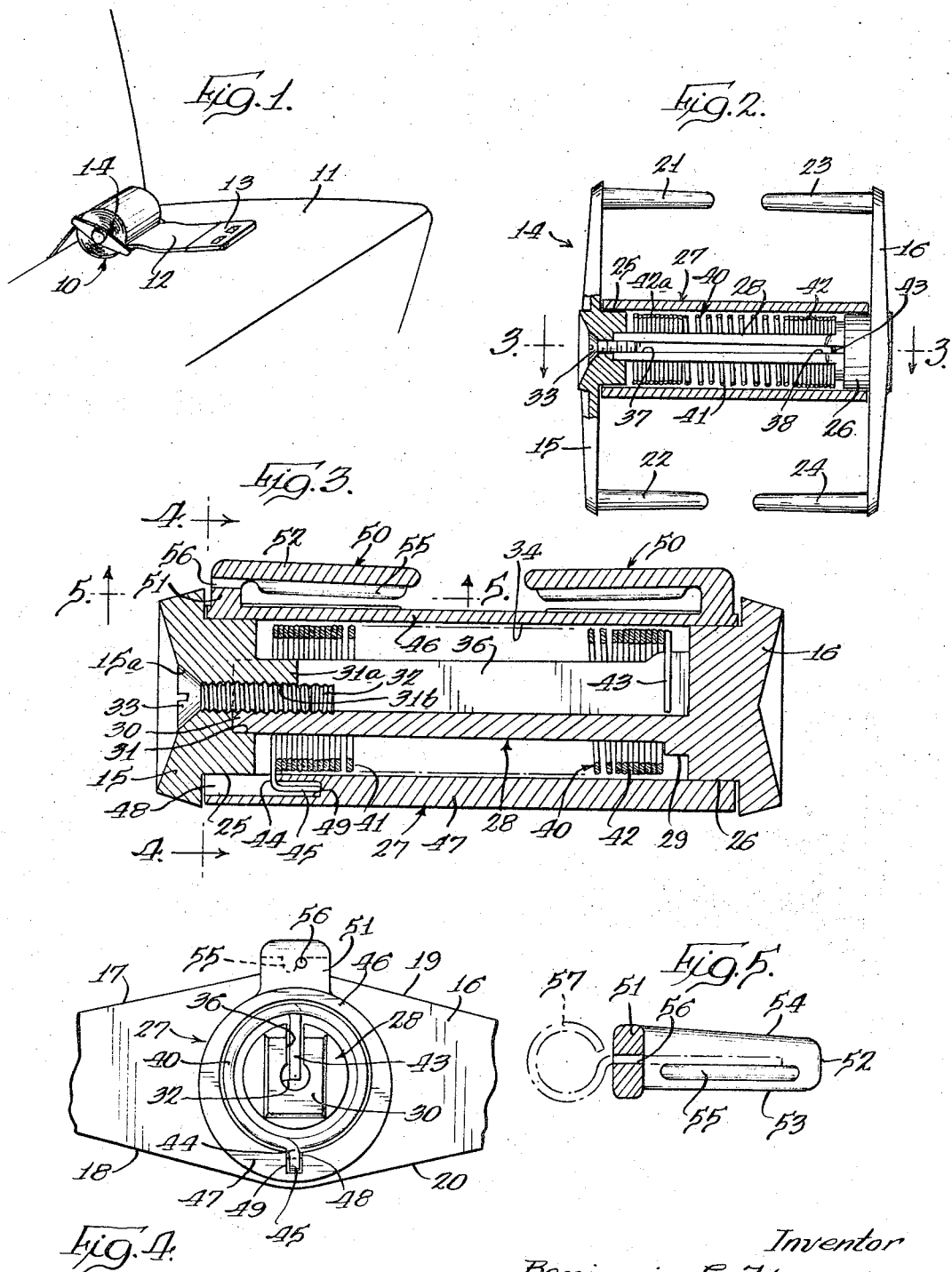

United States Patent Office 3,337,156
Patented Aug. 22, 1967

3,337,156
SEAT BELT RETRACTOR
Benjamin E. Freund, Chicago, Ill., assignor to Jeffrey-Allan Industries, Inc., a corporation of Illinois
Filed Apr. 28, 1965, Ser. No. 451,430
23 Claims. (Cl. 242—107)

ABSTRACT OF THE DISCLOSURE

A retractor for winding a seat belt into a compact roll wherein a tubular sleeve is provided with L-shaped gripping fingers on the outer surface thereof for retaining the seat belt, with a helical spring being provided within the sleeve to bias the same to an equilibrium position in which the seat belt is substantially entirely wrapped upon the sleeve. The helical spring is closely confined within the sleeve and the side members of the retractor to prevent overstressing of the spring and pulling out of the spring end portions that are connected respectively to the sleeve and one side member of the retractor.

This invention relates to a retractor, or reel, and more particularly to a retractor which is adapted to wind an automobile or aircraft seat belt into a compact roll.

Seat belts are standard equipment on many types of vehicles, and are commonly fixed to a support, such as the frame of the vehicle, and pass through or around the seat, so the two free ends may be buckled around a passenger. While seat belts usually function satisfactorily to retain a passenger in a seat, they present a problem when not in use. More particularly, in an automobile it is common for an end of the seat belt to fall where the buckle will be jammed as the automobile door is closed, which may ruin the buckle and also spring the door hinges. Also, the loose seat belts are unsightly in an automobile and are uncomfortable to sit on, as well as being awkward to use if one doesn't know where to find the free ends to buckle together.

Within the past year or two many retractors have been developed which wind the seat belt upon a reel, so that the belt is always in one place against the back of the seat when not in use. The known types of seat belt retractors have proven extremely unreliable, principally because of mechanical failure due to breaking the spring or tearing it loose from the reel. Accordingly, the general purpose of the present invention is to provide an improved seat belt retractor which functions reliably to wind a seat belt into a compact unit when not in use, and which is simple in construction, efficient in operation, well adapted for its intended purposes, and relatively inexpensive to manufacture.

An object of the invention is to provide a seat belt retractor that has improved means for anchoring the retracting springs so as to prevent the spring from pulling out and from breaking during operation.

Another object of the invention is to provide a seat belt retractor with means for preventing the overwinding and distortion of the seat belt retracting spring.

A further object of the invention is to provide improved means for preloading a retractor for a seat belt, or the like.

A still further object of the invention is to restrict the amount of "overshooting" of the seat belt reel when the seat belt is released for retraction. The same structure which limits "overshoot" prevents the reel from being wound backward far enough to distort or break the spring.

These and other objects of the invention will hereinafter become more fully apparent from the following description taken in connection with the accompanying drawings in which:

FIG. 1 is a fragmentary perspective view of a seat having associated therewith a preferred embodiment of the present invention;

FIG. 2 is a plan view of the retractor with parts broken away for clarity of illustration, and with other parts shown in section;

FIG. 3 is an enlarged sectional view, taken generally along line 3—3 of FIG. 2;

FIG. 4 is a fragmentary view, taken generally along line 4—4 of FIG. 3, with one end cap removed; and FIG. 5 is a view, taken generally along line 5—5 of FIG. 3.

While this invention is susceptible of embodiment in many different forms, there is shown in the drawing and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

Referring now to the drawings, wherein like reference numerals, indicate corresponding parts throughout the several views, the tongue half 10 of a seat belt is shown in FIG. 1 in a retracted position upon a vehicle seat 11. The belt half 10 includes a first end 12, hereinafter referred to as the free, or forward end; and a second end, not shown, which is commonly secured to the frame of the vehicle. The forward end of belt 10 includes a tongue 13, which is adapted to be latched into a buckle carried by a second, or buckle half of the seat belt (not shown), that is spaced from the tongue half 10 and may also be provided with a retractor. A retractor 14 (FIG. 2), which is the subject of the present invention, is provided to retain the seat belt in a compact, retracted position, such as that shown in FIG. 1.

Retractor 14 includes a pair of spaced end caps or sides 15 and 16. As best seen in FIG. 4, the end caps are widest adjacent their mid-portions, and include pairs of edges 17–18 and 19–20 which converge outwardly in opposite directions from the mid-portion. Thus, each of sides 15 and 16 is generally diamond shaped in plan view, as is seen in FIG. 1. Guide arms 21–22 and 23–24 are provided at opposite ends of sides 15 and 16, respectively, and are directed toward one another to define a space in which the belt 10 is wound in the retracted position. Cylindrical bosses 25 and 26 are provided on the inner or facing surfaces of sides 15 and 16, respectively, and as best seen in FIG. 3, bosses 25 and 26 define bearing means for supporting a sleeve 27. A further boss 29 of reduced diameter extends outwardly from boss 26 for a purpose to hereafter appear.

An arbor 28 which is generally rectangular in cross-section is formed integrally with end cap 16, and extends outwardly from the inner face of boss 29. The outer end 30 of arbor 28 projects into a rectangular recess 31 in the inner face of the boss 25; and a finger 31a, having a threaded surface 31b, extends inwardly from the recess 31 at the side of a countersunk clearance hole 15a in side 15. Arbor 28 includes a longitudinal slot 36, which extends substantially from end-to-end thereof and is tapered (see FIG. 2) from a wide end 37 adjacent to tip 30 of the arbor 28, to a narrow end 38 extending through boss 29 and terminating adjacent the boss 26. Finger 31a is slidably received in the wide end 37 of slot 36 to key the side 15 to the arbor and prevent relative rotation therebetween. A threaded portion 32 in slot 36 cooperates with the threaded portion 31b of finger 31a to define an internally threaded hole in the tip of the arbor which receives a screw 33 that secures the side 15 to the arbor. The arbor cooperates with sleeve 27 to define a generally annular chamber 34.

A helical torsion spring 40 is received within chamber 34 and, as best seen in FIG. 3, the wire defining spring 40 is rectangular in cross-section and has its wider dimension disposed radially of the chamber. Spring 40 includes a rather loosely coiled central portion 41, and tightly coiled end portions 42 and 42a wherein the adjacent spring convolutions are positioned in substantially abutting relationship with one another. The end 43 of spring 40 adjacent boss 26 is bent radially inwardly and is received in slot 36, and since the slot 36 tapers in length the spring 40 may be mounted quickly on arbor 28 by inserting the spring end 43 in the wide slot portion 37, and then moving the spring lengthwise of the arbor until the spring end 43 is held in the narrow slot portion 38. From FIG. 3, it is apparent that the inner wall of sleeve 27 closely surrounds the outer periphery of spring 40, so that the spring 40 is free to expand radially only a very limited amount. From FIG. 3 it is also clear that the inner diameter of spring 40 closely surrounds boss 29, so that the spring 40 is free to contract inwardly only a limited amount.

As seen in FIGS. 3 and 4, the wall of sleeve 27 gradually increases in thickness circumferentially from a relatively thin portion 46 (at the top of FIG. 3) to a relatively thick portion 47 (at the bottom of FIG. 3) removed 180° from the portion 46. A radial slot 48 is provided in the thick portion 47 of sleeve 27, and a longitudinal passage 49 is provided at the inner end of slot 48. As best seen in FIG. 3, spring 40 has an end portion 44 that extends radially outwardly into the slot 48 and has a tip portion 45 which is bent at right angles to the portion 44, and extends into passage 49. Thus, one end of the spring 40 is secured to the arbor and the other end to the sleeve 28, so the spring acts as a torsion member to bias the sleeve 27 with respect to the end plates 15 and 16. From FIG. 3, it is clear that passage 49 is sufficiently long that as the sleeve 27 is rotated relative to the end caps 15 and 16, and thus increase the length and reduce the diameter of the spring, the spring tip portion 45 will be retained in the passage 49. Because of the abutting convolutions at each spring end, as the spring is wound there is little or no tendency for the outermost spring convolutions to turn elliptical, and most of the diametrical contraction of the spring is taken up at the more loosely wound central spring portion 41; and the bending stresses imparted to the spring ends 43 and 45 are minimized. When the sleeve 27 is rotated relative to the end caps 15 and 16 to withdraw the seat belt and load the spring 40, and then released, there is a tendency for the sleeve 27 to "overshoot" when the seat belt is released and the sleeve 27 is returned to its equilibrium under the bias of the spring 40. This overshoot tendency causes the diameter of the spring to increase and the length of the spring to decrease. However, since the spring 40 is closely confined by the inner wall of sleeve 27, the amount of overshoot is limited; and in a preferred embodiment, the spring 40 is positioned sufficiently close to the inner wall of the sleeve 27 to limit the overshoot to no more than about one revolution and preferably one-half a revolution. The limitation of the amount of overshoot also reduces the amount of bending stresses imparted to the spring ends 43 and 45, and makes it impossible for one to inadvertently wind the reel backward far enough to damage the spring.

Means for gripping the seat belt 10 include finger means, indicated generally at 50, formed integrally with sleeve 27 at opposite ends thereof. As best seen in FIG. 3, the finger means 50 is generally L-shaped in longitudinal cross-section, and includes a spacing boss 51 extending radially outwardly from the end portion of the sleeve adjacent the thin portion 46 thereof, and an axially extending finger 52 which is generally parallel to the outer surface of the sleeve 27. As best seen in FIG. 5, one side 53 of the finger 52 is substantially parallel with the axis of the sleeve 27, while the other side 54 of the finger 52 converges toward the side 53. A downwardly extending rib 55 is provided on the undersurface of the finger 52 adjacent and parallel to the side 53. Fingers 50 are preferably inclined slightly toward the periphery of the sleeve to a position where the distance between the lower portion of rib 55 and sleeve 27 is less than the thickness of the seat belt 10, so that the seat belt is firmly held on the sleeve 27. Serrations may be provided on sleeve 27, if desired, to increase its belt gripping ability.

An opening 56 is provided in the boss 51 of the finger adjacent side 15 in alignment with one side of the rib 55, and may be impaled by a locking pin, shown in broken lines at 57 in FIG. 5. Locking pin 57 functions to preload the retractor 14, and to this end a hole or notch may be provided in the end plate 15 to receive the shank of the locking pin. However, in the illustrated embodiment, the enlarged head or the shank of the locking pin will engage the upper surface of the side 15 of the retractor to prevent relative rotation between the sleeve 27 and the side 15 when the lock pin 57 is in position.

In operation, the retractor 14 is first prewound by rotating the sleeve 27 several times relative to the end plates 15 and 16, whereupon the locking pin 57 is inserted through the opening 56, and the engagement of the enlarged head thereof prevents the sleeve 27 from rotating relative to the end plates. The retractor 14 is then placed on the belt 10 adjacent the midportion thereof by threading the belt under the ribs 55 on the fingers 50. Since the distance between the lower portion of the ribs 55 and the outer periphery of the sleeve 27 is less than the thickness of the belt, the belt will be tightly held to the sleeve 27 by the fingers 50. As best seen in FIG. 4, rib 55 on the finger 50 adjacent side 15 extends downwardly a greater extent than the lower portion of the opening 56, so that when the lock pin 57 is inserted through the opening, the rib 55 will shield the lock pin so that when the belt is inserted under the finger 50, the lock pin 57 will not be pushed out and the belt will not be damaged. After the belt is in position on the retractor, the lock pin 57 is withdrawn, and the spring 40 rotates the sleeve 27 relative to the end plates 15 and 16 to wind the seat belt into a roll upon the sleeve 27, as seen in FIG. 1. The eccentricity of sleeve 27 provided by the enlarged portion 47 opposite from fingers 50 serves to compensate for the winding of the seat belt around the fingers 50 so that a substantially cylindrical roll is produced. Because of the straight side 53 on the fingers 50, there is no gathering of the seat belt material as it is wrapped therearound, and a neat, wrinkle free roll is produced.

For purposes of example and not of limitation, it has been found that a spring having cross-sectional dimensions of .026 inch by .041 inch, and which is positioned to have a clearance of .01 inch within sleeve 27 and a clearance of .01 inch with boss 29, has been entirely suitable for purposes of the invention. With such a spring the "overshoot" of sleeve 27 when the seat belt is released is limited to one-half of a revolution by the engagement of the expanding spring 40 with the closely surrounding sleeve 27. The engagement of the abutting spring convolutions at the spring ends 42 and 42a, and the engagement of the spring with adjacent bosses 26 and 29, prevents the outer spring ends from turning elliptical when the seat belt is withdrawn and the spring is loaded. The unstressed length of the spring should be about equal to the length of the winding chamber between the ends of bosses 25 and 26 in order to restrict winding of the spring to about ten turns by confining its longitudinal expansion, and thereby prevent overwinding of the spring.

The foregoing detailed description is given for clearness of understanding only and no unnecessary limiations should be understood therefrom, as modifications will be obvious to those skilled in the art.

I claim:

1. In a retractor for winding a belt or the like: an arbor; a coil torsion spring loosely surrounding the arbor and having an end secured thereto; rotatable means loosely surrounding the spring, and having at least a portion spaced only slightly radially outwardly of the outer periphery of the spring, an end of the spring being secured to the rotatable means to bias said means rotatably toward a predetermined position; and confining means at the ends of the arbor, and spaced only slightly axially outwardly of the ends of the spring, rotation of said rotatable means in one direction from said position causing said spring to decrease in length and increase in diameter with said increase in diameter being limited by abutment of the outer periphery of the spring against said portion of the rotatable means after about one turn of the rotatable means so as to prevent overstressing of the spring when the rotatable means is rotated in said one direction, and rotation of said rotatable means in the other direction from said position causing the spring to increase in length and decrease in diameter, with said increase in length being limited by abutment of the spring ends against the confining means after about ten turns of the rotatable means so as to prevent overstressing of the spring when the rotatable means is rotated in said other direction.

2. The retractor of claim 1 in which the confining means include facing bearing hubs secured to the ends of the arbor, and the rotatable means is a one-piece sleeve journaled on said hubs.

3. The retractor of claim 2 which includes means on the outside of the sleeve for securing the retractor to a seat belt.

4. A seat belt retractor comprising: a holder including first and second spaced side members; an elongate member connecting said side members, there being a slot from end to end of said elongate member; bearing means on said side members defining a rotational axis; a sleeve surrounding said elongate member and rotatably mounted on said bearing means, said sleeve being adapted to have a seat belt wound therearound; elongate coil torsion spring means extending generally from end to end of said elongate member, said coil spring means having one end portion extending generally radially into said slot in said elongate member adjacent one side member and the other end secured to said sleeve adjacent the other side member to bias the sleeve about said axis and normally retain said seat belt in a retracted position wound upon said sleeve, the length of said one end portion of said spring means being greater than the distance between the outer end of said slot and the inner surface of said sleeve so that one end portion is prevented from pulling off of said slot by the engagement of the outer surface of said spring means with the inner surface of the sleeve; and retainer means on said sleeve for gripping said seat belt.

5. The retractor of claim 4 in which said elongate member has a portion of enlarged dimension at one end cooperating with the sleeve to define a restricted passage therebetween for the end of the spring means that has a portion extending into the slot in the elongate member.

6. The retractor of claim 5 in which the spring means is rectangular in cross-section with its greater dimension radially oriented in the sleeve, and in which the restricted passage is of smaller radial depth than a diagonal cross-sectional dimension of the spring means, whereby a coil of the spring means cannot turn over in said passage.

7. The retractor of claim 4 in which the slot is tapered from a relatively wide portion at one end thereof to a relatively narrow portion at the other end thereof to facilitate insertion of said one end portion of said spring means axially along said slot.

8. The retractor of claim 7 in which the spring has a loosely wound central portion and tightly wound portions at its two ends.

9. The retractor of claim 4 in which the sleeve has a longitudinal slot that extends radially outwardly from the inner surface and is open at an end of the sleeve, and a longitudinal bore providing a continuation of the slot, and in which the end of the spring means opposite from said one end portion has an end portion that extends into said bore and is confined therein by the adjacent side member, the length of said last mentioned spring end portion being greater than the distance between the adjacent side member and the end of said bore, whereby said last mentioned end portion is prevented from pulling out of said bore by engagement of the end of said spring means with said side member.

10. A seat belt retractor comprising: a holder including first and second side members; an elongate member connecting said side members; bearing means on said side members defining a rotational axis; a sleeve surrounding said elongate member and rotatably mounted on said bearing means, said sleeve being adapted to have a seat belt wound therearound; coil torsion spring means connected between said elongate member and said sleeve to bias the sleeve about said axis and normally retain said seat belt in a retracted position mounted upon said sleeve; and means for gripping said seat belt including, a generally L-shaped resilient member having a mounting boss extending generally radially outwardly of said sleeve and a finger extending generally parallel to the sleeve, there being a rib on said finger which is spaced from the sleeve by a distance less than the thickness of said belt.

11. A retractor as defined in claim 10 wherein a hole is provided in said boss in alignment with one edge of said rib, whereby the sleeve may be rotated a predetermined number of turns and a pin may be inserted through the hole to retain the sleeve against the bias of the spring.

12. A retractor for a seat belt comprising: first and second spaced side members; a sleeve rotatably mounted between said side members and tapering circumferentially from a relatively thick portion to a relatively thin portion directly opposite said thick portion, there being a longitudinal bore in said relatively thick sleeve portion; a helical spring having a first end anchored on one of said side members, and a second end portion received in said bore to bias said sleeve toward an equilibrium position in which said seat belt is wrapped around said sleeve; and means on said relatively thin sleeve portion for gripping said seat belt and adapted to have the seat belt wound therearound, said relatively thick sleeve portion defining means for compensating for the thickness of the gripping means so that said seat belt may form a substantially cylindrical roll.

13. The retractor of claim 12 in which one of the spaced side members confines the end portion of the spring in the bore.

14. A retractor for a seat belt comprising: a holder including first and second spaced side members; a generally cylindrical boss on each side member; an arbor integral with and extending outwardly from the front face of the boss on said first side member, said arbor having a relatively wide base and a longitudinal slot extending from end-to-end thereof, said slot tapering from a relatively narrow portion adjacent the base to a relatively wide portion adjacent the tip of the arbor; means securing said second side member to the outer end of said arbor; a sleeve rotatably mounted on said bosses, said sleeve tapering circumferentially from a relatively thick portion to a relatively thin portion directly opposite said thick portion, there being a longitudinal bore in said relatively thick sleeve portion; means on said sleeve for gripping a seat belt including a generally L-shaped resilient member having a mounting boss extending generally radially outwardly from the thin portion of the sleeve, and a finger extending generally parallel to the sleeve, there being a rib on said finger which is spaced from the sleeve by a distance less than the thickness of said belt; and a helical torsion spring within said sleeve and surrounding said arbor, said spring having a loosely wound central portion and tightly wound end portions, one end portion of said spring being bent radially inwardly and received in the narrow portion of said slot, and the other end portion of said sleeve being bent parallel to the sleeve axis and received in said bore, said spring biasing the sleeve to a predetermined position in which the belt is wound around the sleeve, and rotation of the sleeve in one direction from said position causing the spring to enlarge in diameter and shorten, while rotation in the other direction from said position causes the spring to extend lengthwise and reduce its diameter.

15. The retractor of claim 14 in which the sleeve and the side members closely confine the spring in said predetermined position, the spaces between the spring, the sleeve and the side members being such as to prevent overstressing of the spring by rotation of the sleeve in either direction.

16. The retractor of claim 15 in which the space between the sleeve and the spring in said predetermined position restricts the sleeve to no more than about one turn in said one direction, thereby restricting overshoot of the sleeve when the belt is released for retraction.

17. The retractor of claim 14 wherein said second side member contains a recess receiving the tip of said arbor, and a finger extends outwardly from said second side member into said slot to key said second side member to said arbor.

18. A seat belt retractor comprising: first and second spaced side members; a connecting member extending between said side members; a sleeve surrounding said connecting member and rotatably mounted between said side members; means on said sleeve for gripping a seat belt; first retention means defined by a generally radially extending opening in said connecting member; second retention means defined by a generally axially extending opening in said sleeve, said sleeve opening being provided adjacent the first side member and extending in a direction away therefrom; and a helical spring surrounding said connecting member inwardly of said sleeve, said spring having a first generally radially inwardly extending end portion received in the opening in said connecting member, the length of said spring first end portion being greater than the distance between the inner surface of said sleeve and the outer end of the opening in said connecting member, whereby said spring first end portion is prevented from pulling out of said connecting member opening by the engagement of the outer surface of the spring with the inner surface of the sleeve, and said spring having a second generally axially extending end portion received in the opening in said sleeve, the length of said spring second end portion being greater than the distance of said first side member and the outer end of the opening in said sleeve, whereby said spring second end portion is prevented from pulling out of said sleeve opening by the engagement of the end of said spring with said first side member, said spring biasing said sleeve toward an equilibrium position in which said seat belt is wrapped around said sleeve.

19. A retractor as set forth in claim 18 wherein said sleeve includes a thickened portion at one side thereof, said generally axially extending opening being provided in said thickened portion.

20. A retractor as set forth in claim 19 wherein said seat belt gripping means is provided on the side of said sleeve opposite from said thickened portion.

21. A retractor as set forth in claim 18 wherein the opening in said connecting member extends substantially from end to end thereof, with at least said first side member being removably secured to said connecting member, whereby said spring first end portion can be positioned adjacent said second end member by sliding the same lengthwise along said opening.

22. A retractor as set forth in claim 21 wherein the opening in said connecting member is tapered from a relatively wide portion adjacent said first side member to a relatively narrow portion adjacent said second side member.

23. A retractor as set forth in claim 21 wherein said connecting member is formed integrally with said second side member.

References Cited
UNITED STATES PATENTS

| | | | |
|---|---|---|---|
| 776,213 | 11/1904 | Blasdell | 242—107 |
| 2,674,306 | 4/1954 | Prieto | 160—313 |
| 2,725,097 | 11/1955 | Thoreson | 242—107.2 |
| 2,814,504 | 11/1957 | Campbell et al. | 242—107.1 X |
| 2,834,314 | 5/1958 | Moore | 242—107.12 X |
| 3,223,236 | 12/1965 | Troendly | 242—107.11 |
| 3,253,797 | 5/1966 | Peterson | 242—107 X |
| 3,257,147 | 6/1966 | Carter | 297—388 |
| 3,262,653 | 7/1966 | Laupot | 242—107.11 |
| 3,275,256 | 7/1966 | Campbell et al. | 242—74 X |

FOREIGN PATENTS 454,557  9/1936  Great Britain.

FRANK J. COHEN, *Primary Examiner.*

W. S. BURDEN, *Examiner.*